Sept. 29, 1970  L. BEREZANSKY ET AL  3,531,610
PULL CORD TYPE CONVEYOR BELT CONTROL SWITCH
Filed Oct. 30, 1967  3 Sheets-Sheet 1

Louis Berezansky
Mervin C. Hill
INVENTORS

Sept. 29, 1970   L. BEREZANSKY ET AL   3,531,610
PULL CORD TYPE CONVEYOR BELT CONTROL SWITCH
Filed Oct. 30, 1967   3 Sheets-Sheet 2

Louis Berezansky
Mervin C. Hill
INVENTORS

BY Clarence A. O'Brien
and Harvey B. Jacobson
Attorneys

Sept. 29, 1970 L. BEREZANSKY ET AL 3,531,610
PULL CORD TYPE CONVEYOR BELT CONTROL SWITCH
Filed Oct. 30, 1967 3 Sheets-Sheet 3
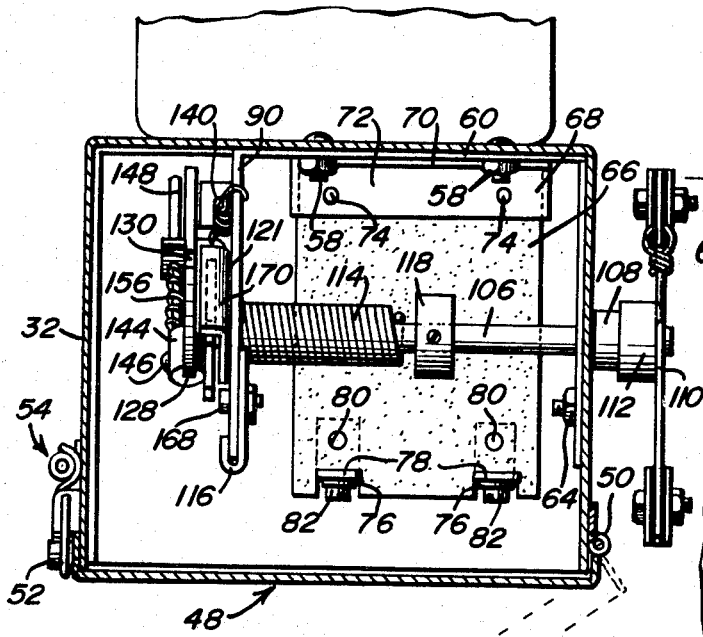
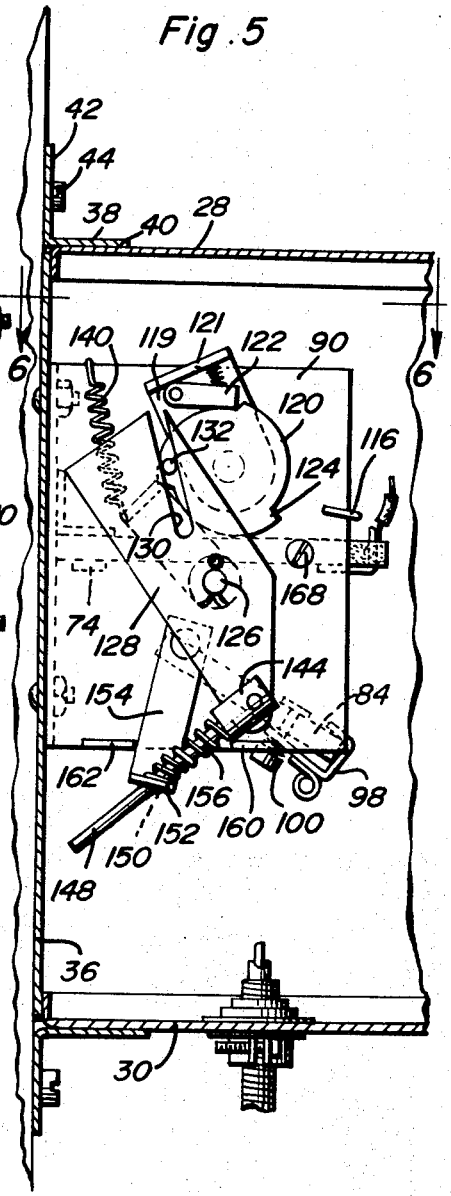
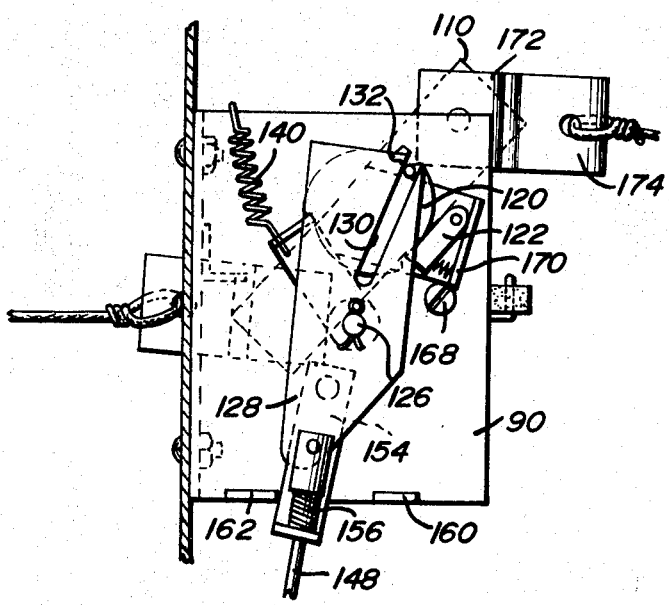
Louis Berezansky
Mervin C. Hill
INVENTORS

United States Patent Office

3,531,610
Patented Sept. 29, 1970

3,531,610
PULL CORD TYPE CONVEYOR BELT
CONTROL SWITCH
Louis Berezansky and Mervin C. Hill, Seward, Pa.,
assignors to Band B Company, a corporation of
Pennsylvania
Filed Oct. 30, 1967, Ser. No. 678,863
Int. Cl. H01n 17/08
U.S. Cl. 200—156                                    6 Claims

ABSTRACT OF THE DISCLOSURE

An electrical circuit control switch mechanism including an actuator extending along the path of movement of a portion of a machine powered by motor means controlled by the electrical circuit and being operative upon being twice pulled along said path to close the electrical circuit after the circuit has been opened and to open the electrical circuit in response to the actuator being pulled along said path only once after the circuit has been closed.

---

The control switch of the instant invention is quite similar to the mechanism disclosed in U.S. Pat. No. 2,843,707 to John Berezansky, dated July 15, 1958 and for Electrical Safety Switch. In addition to the objects set forth in the Berezansky patent the control switch of the instant invention has as its main object to provide a mechanism operable to perform the desired function but which is simplified in design so as to be more dependable in operation and inexpensive to produce.

Another object of this invention is to provide an improved connection between the main oscillatable shaft of the control switch and the pull members operatively connected thereto whereby a mechanically simplified and yet effective means is provided for operatively connecting the pull members to the oscillatable shaft portion of the control switch in order to intermittently advance the control shaft approximately 120 degrees.

A final object of this invention to be specifically enumerated herein is to provide a control switch including components thereof which may be readily manufactured from basic components with a minimum amount of machining.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a vertical sectional view similar to FIG. 4 but with the movable components of the control switch illustrated in different positions;

FIG. 6 is a horizontal sectional view taken substantially upon the plane indicated by the section line 6—6 of FIG. 5; and FIG. 7 is a fragmentary vertical sectional view similar to FIGS. 4 and 5 but illustrating the movable components of the control switch in still different positions of operation.

Figure 1:
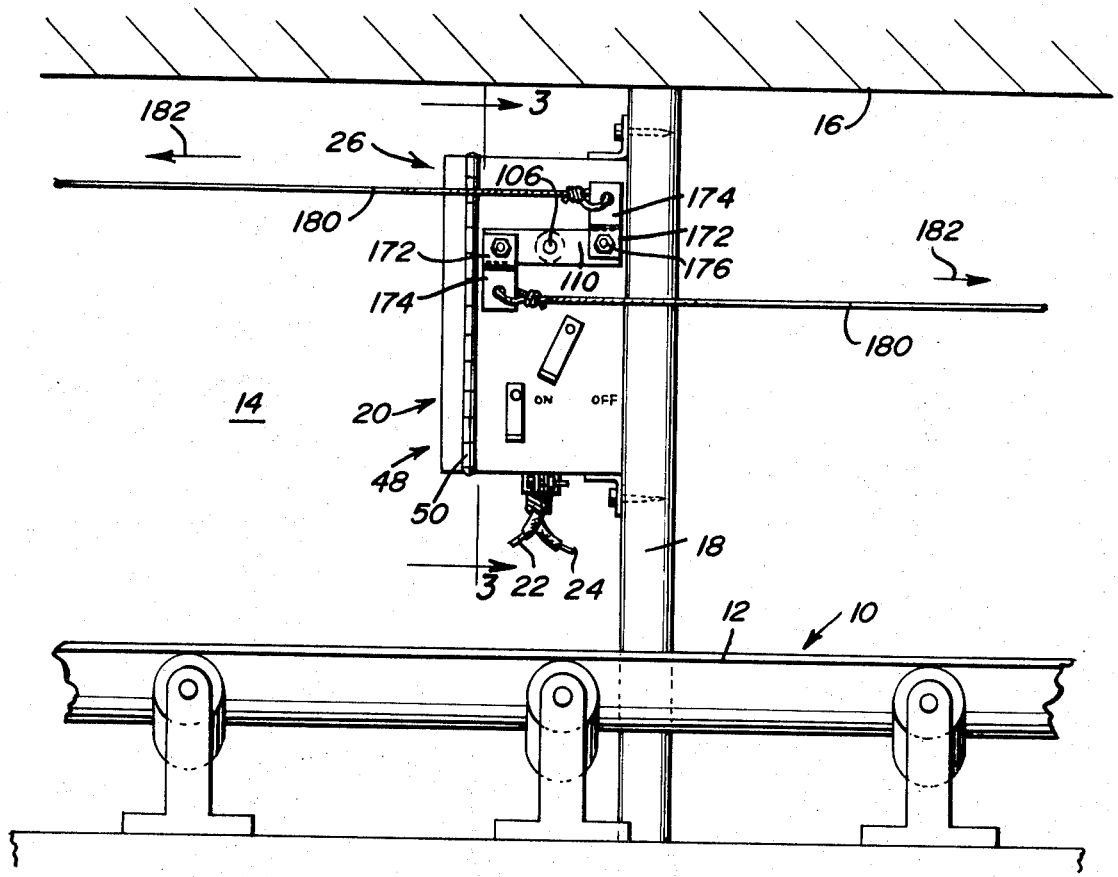
FIG. 1 is a fragmentary side elevational view of a conveyor assembly with which the control switch of the instant invention is operatively associated.
Figure 2:
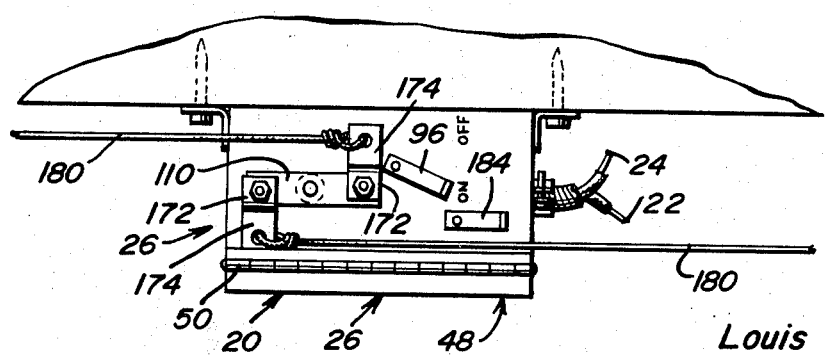
FIG. 2 is a side elevational view of the control switch assembly illustrating a modified mounting position thereof.
Figure 3:
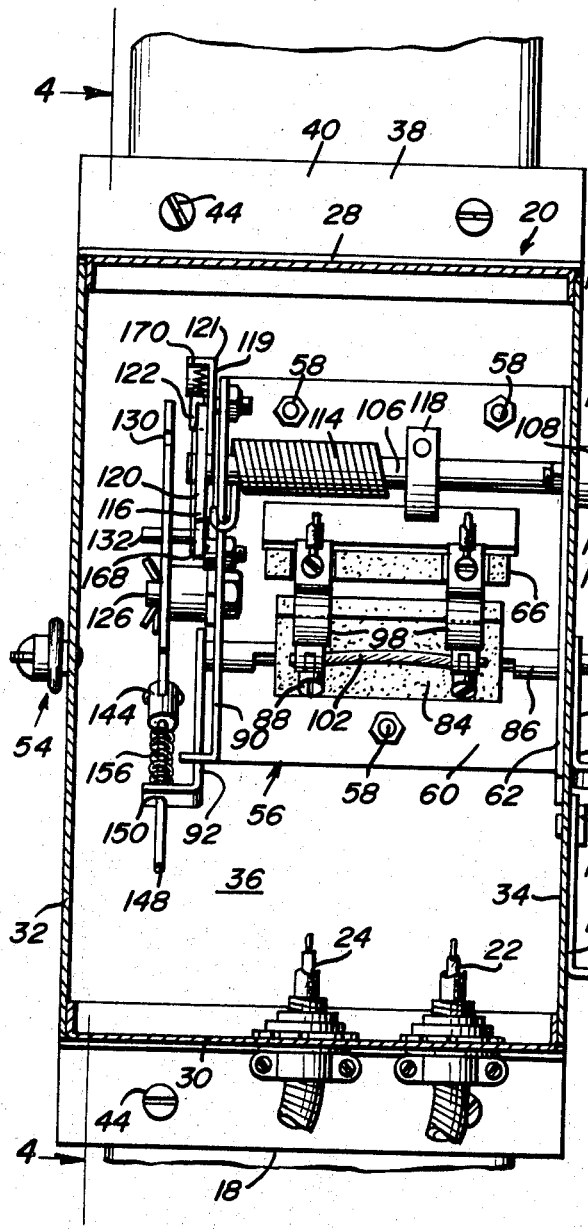
FIG. 3 is an enlarged fragmentary vertical sectional view taken substantially upon the plane indicated by the section line 3—3 of FIG. 1.

Referring now more specifically to the drawings, the numeral 10 generally designates a conveyor assembly including a horizontally movable reach 12 upon which various materials as well as personnel may be conveyed. The conveyor assembly 10 extends through an area 14 of low vertical height including a low ceiling 16 and a plurality of upstanding support posts including post 18.

The conveyor assembly 10 is powered by means of an electric motor (not shown) or any other suitable prime mover which may be electrically controlled by opening and closing a control circuit therefor and the control switch generally referred to by the reference numeral 20 is provided and interposed in such a control circuit, the latter including conductors 22 and 24.

The control switch includes a housing referred to in general by the reference numeral 26 including end walls 28 and 30, front and rear side walls 32 and 34 and a bottom wall 36. The end walls 28 and 30 have generally L-shaped mounting brackets 38 secured thereto and each bracket 38 includes a mounting flange 40 secured to the corresponding end wall in any convenient manner such as spotwelding and a second flange 42 which is suitably apertured to receive the shank portions of fasteners 44 therethrough utilized to secure the housing 26 to the post 18.

The housing includes a hinged top wall assembly referred to in general by the reference numeral 48 and which is swingably supported from the rear side wall 34 by means of a hinge assembly 50. The top wall assembly 48 has a keeper 52 secured thereto in any convenient manner and the front side wall 32 has an overcenter latch assembly generally referred to by the reference numeral 54 secured thereto and operable to releasably engage the keeper 52 and retain the top wall assembly 48 in the closed position.

A generally U-shaped mounting plate referred to in general by the reference numeral 56 is provided and is secured to the bottom wall 36 by means of suitable fasteners 58 secured through the bight portion 60 of the mounting plate 56 and the bottom wall 36. The mounting plate 56 includes one side flange 62 which is secured to the rear side wall 34 by means of a fastener 64 secured through the flange 62 and the rear side wall 34 and a stationary insulative contact mounting panel 66 is supported from the bight portion 60 by means of an L-shaped mounting bracket 68 including one flange 70 generally paralleling and secured to the bight portion in any convenient manner such as spotwelding and a second flange 72 to which the lower end of the contact mounting panel 66 is secured by means of fasteners 74.

The upper end of the mounting panel 66 is notched as at 76 and has a pair of L-shaped contact bars 78 secured thereto by means of suitable fasteners 80. The contact bars 78 include threaded contact terminals 82 to which the conductors 22 and 24 are secured.

A second contact mounting panel 84 has its lower end secured to an oscillatable shaft 86 intermediate its opposite ends by means of suitable fasteners 88. One end of the shaft 86 is journaled through the flange 90 of the mounting plate 56 remote from the rear side wall 32 and has the long leg of an L-shaped lever 92 mounted thereon for swinging movement therewith. The other end of the shaft 86 is journaled through the flange 62 and the rear side wall 34 and has the long leg 94 of a lever 96 secured thereto. A pair of spring mounted contact bars 98 are mounted on the upper end of the panel 84 by means of fasteners 100 and the contact bars 98 are bridged by a conductor 102 extending therebetween.

A second shaft 106 is supported from the mounting bracket 56 and the housing 26 and has one end portion journaled through the flange 90 and the other end portion journaled through the flange 62 and the rear side wall 34. The end of the shaft 106 which projects through the rear side wall 34 has a spacing and bearing collar 108 disposed thereon outwardly of the rear side wall 34 and a crosshead 110 is mounted on a mounting sleeve 112 secured in adjusted rotated position on the end of the shaft 106 outwardly of the collar 108. Further, a torsion spring 114 is disposed about the shaft 106 adjacent the flange 90 and has one end 116 hooked over the top of the flange 90 and the other end anchored to a collar 118 secured in adjusted rotated position on the shaft 106 intermediate the torsion spring 114 and the flange 62.

A ratchet wheel or disk 120 is journaled on the end of the shaft 106 which projects through the flange 90 and the long leg 119 of an L-shaped mounting bracket 121 is mounted on the shaft 106 for rotation therewith between the ratchet disk 120 and the flange 90. A spring-urged ratchet dog 122 is mounted on the long leg 119 and engageable with the teeth 124 of the ratchet disk 120, which teeth 124 equal three in number and are spaced equally circumferentially about the ratchet disk 120.

A pivot fastener 126 is secured through the flange 90 and has journaled thereon an oscillatable lever 128. The pivot fastener 126 passes through the lever 128 intermediate its opposite ends and one end of the lever 128 has a slot 130 formed therein in which a laterally outwardly projecting pin 132 carried by the ratchet disk 120 is slidably received. The pivot fastener 126 also has journaled thereon one end of a detent arm 136 whose other end includes a laterally directed portion 138 engageable with the teeth 124. The detent arm 136 has one end of an expansion spring 140 secured thereto and the other end of the expansion spring 140 is hooked behind one edge portion of the flange 90 and maintains the detent arm 136 in constant engagement with the periphery of the ratchet disk 120. The detent arm 136 positively prevents rotation of the ratchet disk 120 in a counterclockwise direction as viewed in FIGS. 4, 5 and 7 of the drawings.

The end of the lever 128 remote from the slot 130 has a bifurcated head portion 144 pivotally secured thereto as at 146 and the bifurcated head portion includes an elongated shank portion 148 which is loosely slidably received through an aperture 150 formed in the short angulated leg 152 of the lever 154 of which the long leg 92 comprises a part. An expansion spring 156 is disposed about the shank portion 148 intermediate the bifurcated head portion 144 and the short leg 152 of the lever 154 and the flange 90 includes a pair of laterally directed tab portions 160 and 162 engageable by the long leg 92 of the lever 154 to define limits of oscillation of the lever 154 and thus limits of oscillation of the shaft 86 upon which the lever 154 is mounted.

Oscillation of the shaft 106 is limited by means of a stop fastener 168 secured through the flange 90 in predetermined position and with which the laterally directed end portion 70 of the L-shaped mounting bracket 121 for the ratchet detent 122 is engageable.

With attention now invited more specifically to FIGS. 1, 2, 3 and 7 of the drawings, it may be seen that the crosshead 110 extends outwardly from opposite sides of the shaft 106 and has the bifurcated end portions 172 of a pair of arms 174 pivotally secured thereto by means of fasteners 176. The arms 174 are swingable between limit positions of oscillation disposed 180 degrees apart and at right angles to the longitudinal centerline of the crosshead 110. Accordingly, the arms 174 illustrated in FIG. 1 of the drawings are illustrated in the limit positions of rotation thereof in a counterclockwise direction.

A pair of elongated flexible pull members 180 have corresponding ends secured to the free ends of the arms 174 and it may be seen that a pull on either of the pull members 180 in the direction of the arrows 182 in FIG. 1 of the drawings will cause the shaft 106 to oscillate from the limit position thereof toward which it is urged by means of the torsion spring 114 to the limit position thereof determined by the abutment fastener 168 by engagement of the L-shaped mounting bracket 121 with the abutment fastener 168. During this oscillation of the shaft 106, the L-shaped mounting bracket 121 is oscillated slightly more than 120 degrees and the ratchet dog 122 carried by the L-shaped mounting bracket 121 thereby causes the ratchet disk 120 to rotate 120 degrees from the position thereof illustrated in FIG. 4 of the drawings to the position thereof illustrated in FIG. 5 of the drawings at which time the pin 132 will pass the center position and oscillate the lever 128 from the position thereof illustrated in FIG. 4 of the drawings to the position thereof illustrated in FIG. 5 of the drawings thus causing the lever 154 to swing from the limit position thereof illustrated in FIG. 4 of the drawings to the limit position thereof illustrated in FIG. 5 of the drawings. This of course pivots the mounting plate 84 from the position thereof illustrated in FIG. 4 of the drawings to the position thereof illustrated in FIG. 5 of the drawings and causes the contact bars 98 to move from engagement with the contact bars 78 and thus open the circuit of which the conductors 22 and 24 comprise a part.

Figure 4:
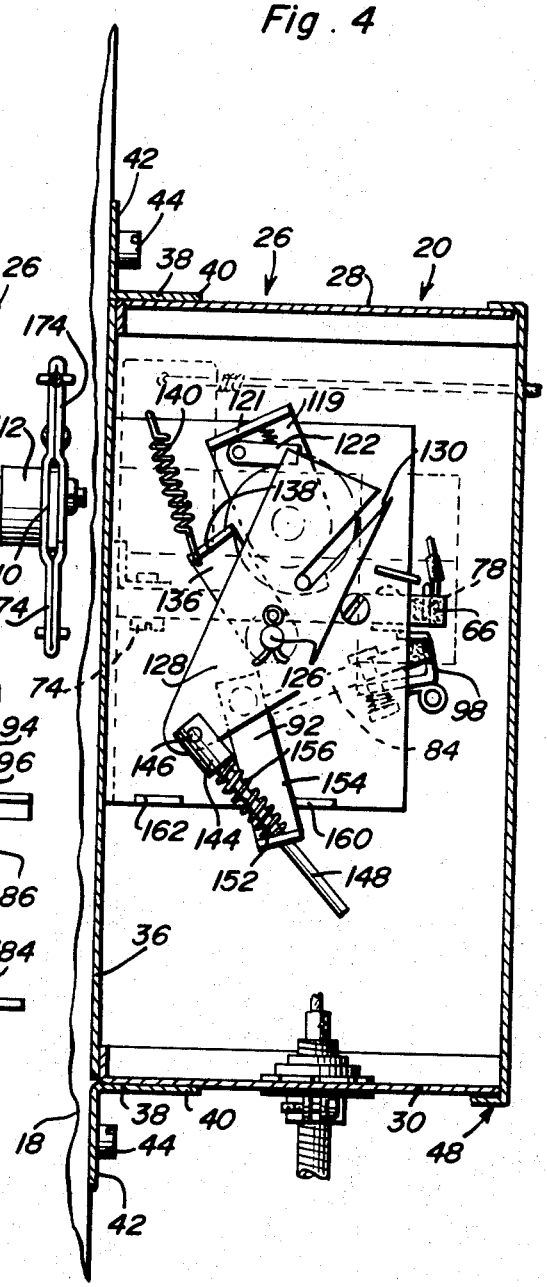
FIG. 4 is a fragmentary vertical sectional view taken substantially upon the plane indicated by the section line 4—4 of FIG. 3.

After the pull on either of the pull members 180 has been released and the crosshead 110 has been allowed to oscillate back to the limit position thereof illustrated in FIG. 1 of the drawings by the torsional force of the torsion spring 114, the next pull on either of the pull members 180 will again effect clockwise rotation of the L-shaped mounting bracket 121 as viewed in FIGS. 4 and 5 of the drawings to thereby further advance the ratchet disk 120 120 degrees to the position thereof illustrated in FIG. 7 of the drawings. This rotation of the ratchet disk 120 will not affect the position of the mounting plate 84 or the contact bars 98 supported therefrom inasmuch as movement of the lever 154 past the center position thereof will not be achieved, although the lever 154 will be shifted from the position thereof illustrated in FIG. 5 of the drawings to the position thereof illustrated in FIG. 7 of the drawings. Then, the next pull on either pull member 180 will cause the ratchet disk 120 to again be advanced 120 degrees from the position thereof illustrated in FIG. 7 of the drawings to the position thereof illustrated in FIG. 4 of the drawings during which advance the pin 132 will pass the center position and cause the lever 128 to swing past its center position and thus the lever 154 to swing from the position thereof illustrated in FIG. 7 of the drawings to the position thereof illustrated in FIG. 4 of the drawings. This movement of the lever 154 will of course cause oscillation of the shaft 186 to swing the mounting plate 84 back to the position thereof illustrated in FIGS. 3 and 4 of the drawings so as to again bring the contact bars 98 into contact with the contact bars 78 to thus complete the circuit represented by the conductors 22 and 24.

From the foregoing it may be seen that two pulls on either pull member 180 are required to close the circuit in which the conductors 22 and 24 are disposed and that after the circuit has been closed only a single pull on either pull member 180 is required to open the circuit represented by the conductors 22 and 24. Thus, if a person riding the reach 12 of the conveyor assembly 10 wishes to terminate operation of the conveyor assembly 10, only one pull is required on either pull member 180 to effect such termination of the operation of the conveyor assembly 10. However, if it is desired to initiate operation of the conveyor assembly 10, a first, and perhaps accidental pull on either pull member 180, will not be operative to begin operation of the conveyor assembly 10 in that a second pull on either pull member 180 is necessary for such operation of the conveyor assembly 110 to be started by closing of the circuit in which the conductors 22 and 24 are disposed.

The rear side wall 34 has a switch overriding arm 184 pivotally secured thereto by means of a friction type pivot fastener 186 and the arm 184, when the arm 96 is in the off position is swingable into position with the free end thereof adapted for abutting engagement with the free end of the arm 96 so as to prevent the latter from swinging from the off position to the on position. Therefore, the switch overriding arm 184 may be utilized to prevent the control switch from actuating the conveyor assembly 10 independently of how many times the pull members 180 are pulled.

Inasmuch as the arms 174 are in their limit positions of clockwise rotation relative to the crosshead 110 when they are positioned as illustrated in FIG. 1 of the drawings, the crosshead 110 may be oscillated more than the required 120 degrees while maintaining a reasonable leverage between the pull members 180 and the crosshead 110.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a mechanism for operation of a power control device wherein a plurality of actuations results in the operation of the control device and a single actuation results in the non-operation of the control device, a rotatable ratchet wheel having at least three ratchet teeth, a ratchet pawl engageable with said teeth for intermittently advancing said wheel, a dead center spring pressed lever having an elongated longitudinal slot therein, a pin on said ratchet wheel slidable within said slot, said lever being pivotally mounted for oscillation about an axis generally paralleling the axis of rotation of said wheel and in a manner such that said pin on said ratchet wheel must be moved an arcuate distance of at least two ratchet teeth, after said lever is swung past the dead center position thereof in one direction, to swing said lever in the other direction past said dead center position, and a second ratchet pawl mounted for successive engagement with said ratchet teeth to prevent backward rotation of said ratchet wheel, an oscillatory shaft which carries the first-mentioned ratchet pawl, means biasing said shaft to rotate in the direction of rotation thereof opposite to the direction of rotation thereof which causes the first-mentioned ratchet pawl to advance said ratchet wheel, said ratchet wheel being mounted on said shaft for rotation relative to said shaft, said shaft having a pair of oppositely outwardly projecting arm portions mounted thereon for rotation therewith, the remote end portions of said arms having corresponding ends of a pair of secondary arms pivotally secured thereto for swinging movement of said secondary arms about axes generally paralleling said shaft between positions generally aligned with said arm portions and with their free ends projecting outwardly beyond the free ends of said arm portions and limit positions with said secondary arms disposed generally at right angles to said arm portions and their free ends projecting from opposite sides of said arm portions, and a pair of generally parallel elongated pull members including overlapped end portions secured to said free ends of said secondary arms.

2. The combination of claim 1 wherein said ratchet wheel includes three ratchet teeth.

3. The combination of claim 1 wherein said ratchet teeth engaging pawl include portions thereof engageable with said teeth mounted for movement generally radially of the axis of rotation of said ratchet wheel.

4. The combination of claim 1 wherein said slot is formed in one end portion of said lever, a compression spring acting upon the other end portion of said lever and operable to urge said lever in opposite directions away from said dead center position upon slight angular displacement in said opposite directions from said dead center position, and said axis of oscillation of said lever being disposed intermediate the opposite end portions of said lever.

5. The combination of claim 1 wherein the side walls of said slot are generally straight throughout the portions thereof in which said pin is slidable.

6. In combination with an operating shaft to be oscillated between limit positions of rotation disposed between 110° and 180° apart, a pair of oppositely outwardly projecting arm portions mounted on said shaft for rotation therewith, the remote end portions of said arm portions having corresponding ends of a pair of secondary arms pivotally secured thereto for swinging movement of said secondary arms about axes generally paralleling said shaft between positions generally aligned with said arm portions and with their free ends projecting outwardly beyond the free ends of said arm portions and limit positions with said secondary arms disposed generally at right angles to said arm portions and their free ends projecting from opposite sides of said arm portions, and a pair of generally parallel elongated flexible pull members including one pair of adjacent overlapped end portions secured to said free ends of said secondary arms and a second pair of remote end portions adapted to be stationarily anchored with both of said pull members at least slightly tensioned when said arm portions are positioned so as to generally parallel said pull members.

References Cited

UNITED STATES PATENTS

| | | | |
|---|---|---|---|
| 692,783 | 2/1902 | Dyre | 74—141 |
| 2,843,707 | 7/1958 | Berezansky et al. | 200—156 |
| 3,216,265 | 11/1965 | Christoff | 74—142 |
| 3,327,552 | 6/1967 | Broders et al. | 74—469 |

FOREIGN PATENTS

| | | |
|---|---|---|
| 82,151 | 9/1919 | Switzerland. |
| 95,133 | 6/1922 | Switzerland. |

ROBERT K. SCHAEFER, Primary Examiner

R. A. VANDERHYE, Assistant Examiner

U.S. Cl. X.R.

74—469